United States Patent [19]

Hattori et al.

[11] Patent Number: 5,218,872
[45] Date of Patent: Jun. 15, 1993

[54] FLUIDIC FLOWMETER FOR USE WITH DISTURBED FLUIDS

[75] Inventors: Tatsuo Hattori, Chiba; Takashi Ueki; Katsuhito Sakai, both of Tokyo; Toshiki Ishikawa, Tachikawa; Yukihiro Niimi, Nagoya; Hideyuki Ochi, Tokyo, all of Japan

[73] Assignees: Tokyo Gas Company Limited; Aichi Tokei Denki Co., Ltd.; Kimmon Manufacturing Co., Ltd., all of Japan

[21] Appl. No.: 716,815

[22] Filed: Jun. 17, 1991

[30] Foreign Application Priority Data

Jun. 18, 1990 [JP] Japan .................................. 2-160285

[51] Int. Cl.⁵ .............................................. G01F 1/32
[52] U.S. Cl. ................................... 73/861.19; 73/198
[58] Field of Search ............................. 73/861.19, 198

[56] References Cited

U.S. PATENT DOCUMENTS

| | | | |
|---|---|---|---|
| 2,929,248 | 3/1960 | Sprenkle | 73/198 |
| 3,889,534 | 6/1975 | Grant | 73/861.19 |
| 4,182,172 | 1/1980 | Wennberg et al. | 73/861.19 |
| 4,280,360 | 7/1981 | Kobayashi et al. | 73/198 |
| 4,404,859 | 9/1983 | Ohsawa et al. | 73/861.19 X |

Primary Examiner—Herbert Goldstein
Attorney, Agent, or Firm—McGlew and Tuttle

[57] ABSTRACT

A fluidic flowmeter is located downstream of a valve. A wire gauze or net having small meshes is located on the upstream side of a nozzle forming the inlet to the fluidic element to stabilize flow.

16 Claims, 4 Drawing Sheets

GAS

GAS

GAS

FLUIDIC FLOWMETER FOR USE WITH DISTURBED FLUIDS

FIELD OF THE INVENTION

This invention relates in general to a flowmeter for measuring the flowrate of city gas and other gases.

Specifically the fluidic flowmeter is a flowmeter for measuring the flowrate by placing an adhesion wall and a feed-back flow channel on the downstream side of nozzle from which the fluid to be measured is blown out. This generates a vibration in the fluid on the adhesion wall while utilizing the Coanda effect. The pressure propagation is transmitted to the feed-back flow channel, and the fluid vibration (oscillation frequency) can be designed to be proportional to the fluid to be measured.

BACKGROUND OF THE INVENTION

Similar flowmeters with this type of structure, are described in the U.S. Pat. No. 3,640,133, U.S. Pat. No. 3,690,171, Japan Patent Official Disclosure No. 48-54962, Japan Patent Official Disclosure No. 53-77558 and Japan Patent Official Disclosure No. 59-184822.

Because this type of flowmeter functions to blow out the measured fluid from the nozzle, as described above, in order to generate the fluid vibration, it is essential that the flowrate of the fluid being blown out of this nozzle be stable in proportion to the flowrate, and a measurement error occurs if the flow lacks this stability.

The flowrate of fluid being blown out of the nozzle is governed greatly by the shape of the upstream side of the nozzle together with the shape of nozzle. For example, if there should be anything hindering a smooth flow in a flow channel on the upstream side of nozzle, a vortex flow appears to the fluid flowing into the nozzle, and this vortex flow exerts a great influence on the flowrate, by changing the flowrate.

Therefore, as it can be understood from the aforesaid officially know fluidic flowmeters, such a device has been made such that a straight flow channel is formed on the upstream side of nozzle for making a vortex flow unlikely to appear.

Forming a straight flow channel on the upstream side of nozzle in this way is possible in an experimental laboratory experiment room or installation conditions with plenty of room. However, if a compact size is required for installation conditions like the gas meter of city gas being supplied to general households, for example, through piping, it is impossible to form a sufficient straight flow channel on the upstream side of nozzle. Moreover, in the case of this type of gas meter, the valves and governors are frequently installed on the upstream side of nozzle, and there also exist the bends of piping or the land offset of joints, all of which become factors causing vortexs in the gas flow and exerting a detrimental influence on the stability of flowrate.

SUMMARY AND OBJECTS OF THE INVENTION

An object of this invention is to propose a fluidic flowmeter having means for stabilizing the flowrate of measured fluid that flows into the nozzle.

The present invention overcomes the difficulty of disturbed fluids disrupting the measurement of flowrate. Fluid passing through a fluidic flowmeter passes through a nozzle and then into a vibration generating chamber. This vibration generating chamber having an adhesion wall and a feedback flow channel downstream of the nozzle. The fluid passing by the adhesion wall is influenced by the Coanda affect. This Coanda affect along with the feedback flow channel generates a fluid vibration (oscillation frequency) in the vibration generating chamber proportional to the flow rate. Disturbances in the fluid passing through the nozzle can adversely affect the generation of fluid vibrations. According to the invention a fluid adjusting means is positioned before the nozzle in order to smooth out the flow of fluid passing into the nozzle. The fluid adjusting means is preferably a wire net having a trapezoidal shape and covering the nozzle. It is also possible to place another wire net further upstream from the trapezoidal net. The placing of a net in front of a nozzle smooths out the flow of the fluid and allows the vibration generating chamber to actively generate a fluid vibration in proportion to the amount of fluid passing through.

The present invention is particularly useful in areas where a flowrate is to be measured and disturbances in the flow are unavoidable. Such areas occur in common everyday flowmeter applications. Previously fluidic flowmeters could either not be used or high inaccuracies had to be tolerated. It is an object of the present invention to create a fluidic flowmeter that is simple in design, rugged in construction and economical to manufacture, for use in the many areas in which previously were not suitable for a fluidic flowmeter.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
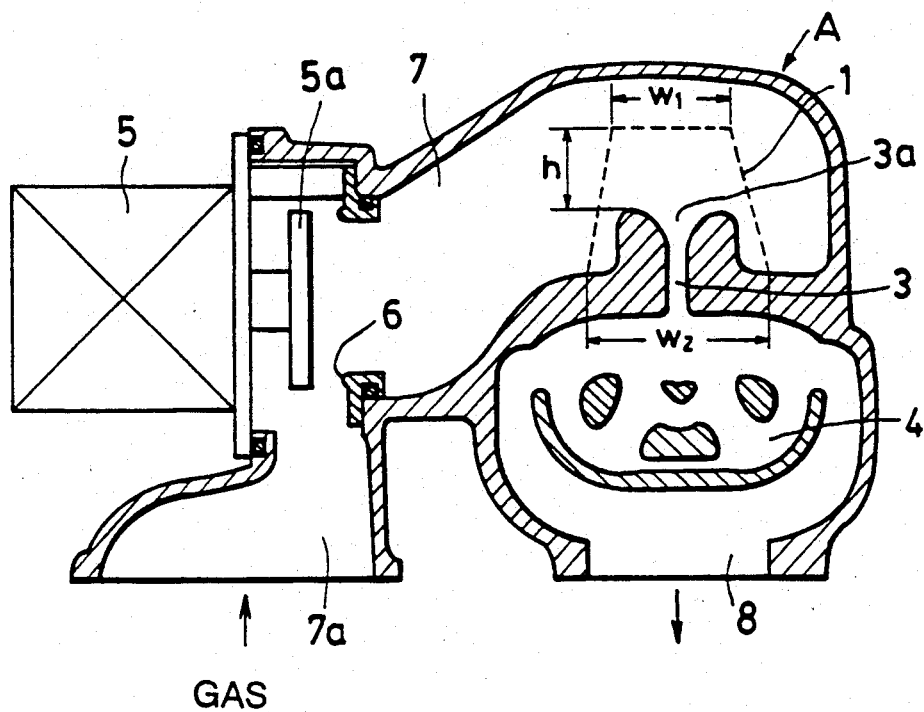
FIG. 1 is a plane view of a fluidic element to which a wire gauze is fitted so as to surround the inlet of nozzle on the upstream side of nozzle.

The fluidic element of a flowmeter embodied in accordance with the present invention is shown in FIG. 1.

Element 1 is a trapezoidal shaped net preferably made from wire gauze fitted on the upstream side of nozzle inlet 3 on the side of inlet 3a of nozzle 3 of fluidic element "A", with the preferred size of wire gauze being 20 mesh, (20 wires per inch) and a trapezoidal shape with the height from the top side of nozzle inlet 3a being h=16 mm, the width of top side being $W_1 = 20$ mm and the width of bottom side being $W_2 = 30$ mm.

Numeral 4 in the figure is a fluid vibration generating chamber formed on the downstream side of nozzle 3, and 5 is a solenoid for driving the valve 5a to close the valve seat 6 formed in the fluid flow channel 7 leading to the nozzle 3, and the flow of gas is stopped by closing this valve 5a, for instance, at the time of emergency. Number 8 is an outlet of the measured fluid that has passed through the fluid vibration generating chamber 4.

In the preferred embodiment, the measured fluid flows into the fluid flow channel 7, inside the fluidic element "A" in an upward direction from the fluid inlet 7a that is connected to piping, then turns 90° to a horizontal direction in the valve seat 6, and then turns 90° to go in a downward direction while slightly rising therein. The fluid enters into the nozzle 3 from the nozzle inlet 3a and blows out into the fluid vibration generating chamber 4. Inside the fluid vibration generating chamber 4, the fluid vibrations are generated by the publicly known action, and this fluid vibration is converted into electric signal and input into a flowrate processor means. This electrical signal is processed in the flowrate processor means and its integrated value is indicated on the display screen.

In the aforesaid action, not only is the flow direction of measured fluid almost turned around while travelling to the nozzle inlet 3a via the valve seat 6 from the fluid inlet 7a, but the protrusions of valve 5a and valve 6 also become hindrances of flow while the fluid passes through these valves, thus causing the vortex flows at those respective locations.

This vortex flow makes the flowrate unstable, but the wire gauze 1 serves to adjust the flowrate of measured fluid immediately before the fluid enters into the nozzle inlet 3a.

Because this adjusted measured fluid enters into the nozzle 3 and is blown out, the fluid becomes a stable flowrate regardless of the flowrate regions, and as a result, the generation of fluid vibration can also be stabilized.

Figure 4:
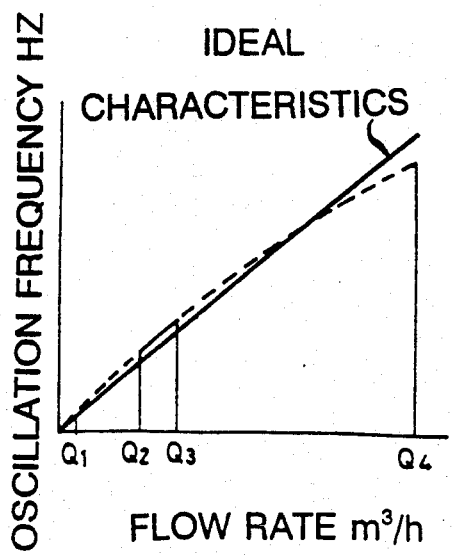
FIG. 4 is an explanatory graph for explaining the difference of measurable flowrate regions in the cases where the wire gauze has been fitted to the upstream side of nozzle and where the said wire gauze has not been fitted.
Figure 5:
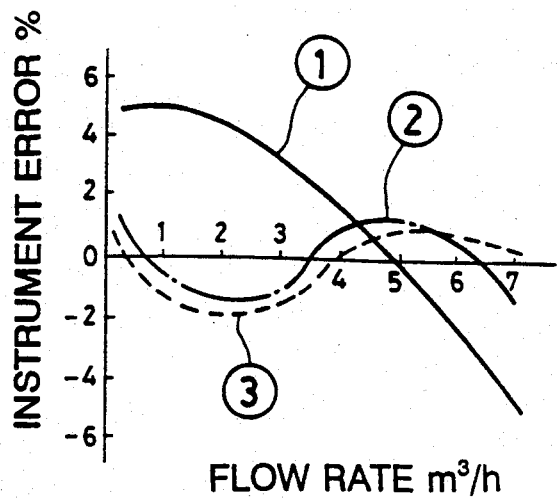
FIG. 5 is a graph of comparing the performances of fluidic elements shown in FIG. 1, FIG. 2 and FIG. 3.

In this embodiment, the measurable flowrate range of 3 m³/h type is 0.1 to 3 m³/h, whereas the measurable flowrate range of 5 m³/h type becomes 0.1 to 5 m³/h, thus the stable fluid vibration (oscillation frequency) can be generated closer to the ideal straight line as shown in FIG. 4. In any of the types, as shown in FIG. 5, instrument error is less than 5%.

However, if pressure loss greater than 20 mmH₂O can be taken into consideration, a greater flowrate region can be deemed to be the measurable flowrate range.

Figure 2:
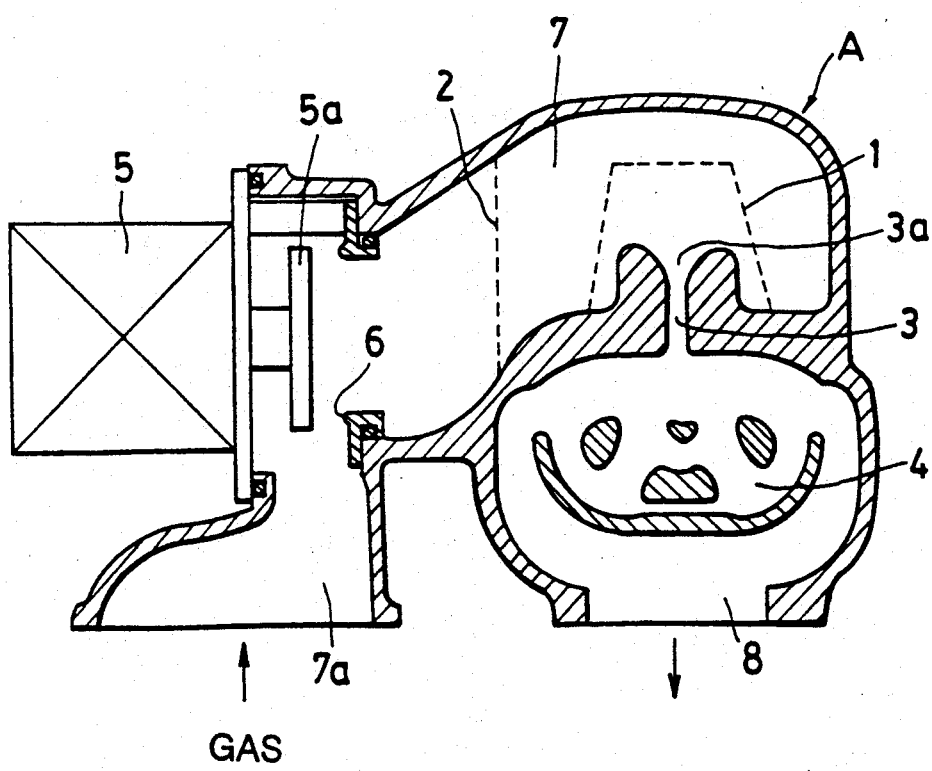
FIG. 2 is a plane view of a fluidic element to which a second wire gauze is fitted to the upstream side of nozzle.

FIG. 2 is the case where the second wire gauze 2 of #30 mesh has further been fitted to the position 25 mm apart on the downstream side of valve 5a in addition to the wire gauze 1 of FIG. 1. The instrument error in this case is less than +/−2% in both the types as shown in FIG. 5.

Figure 3:
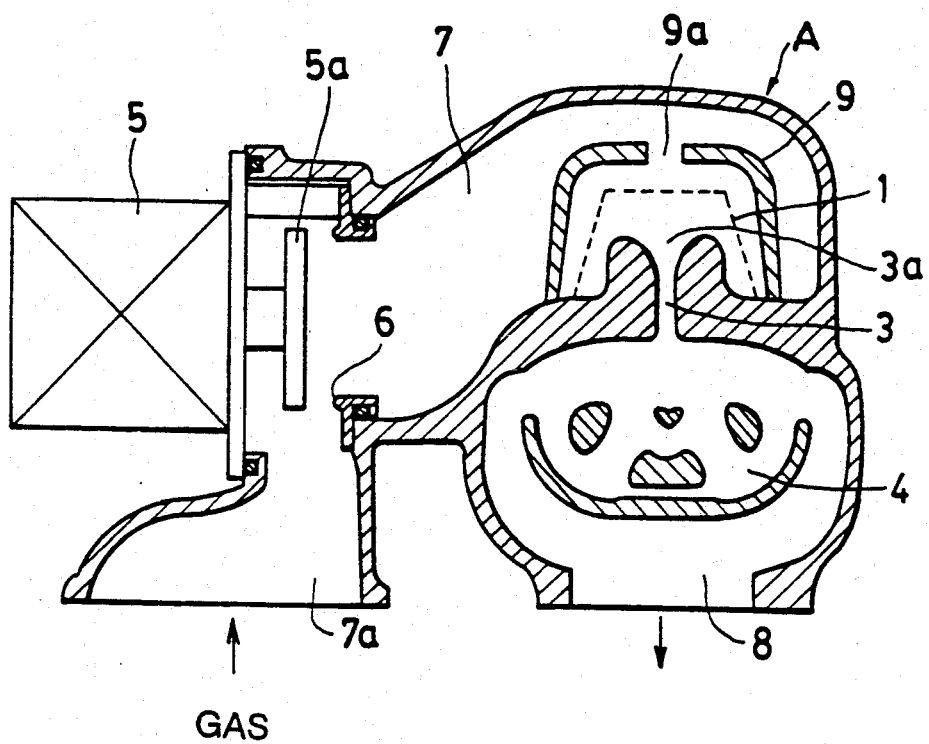
FIG. 3 is a plane view of a fluidic element to which a gate nozzle for flow adjustment is installed on the upstream side of wire gauze fitted on the upstream side of nozzle.

FIG. 3 is an embodiment wherein the wire gauze 1 of the same shape as that of FIG. 1 is placed at the position 8 mm apart from the upstream side of nozzle 3, and the gate nozzle 9 consisting of slit 9a of 10 mm width is further fitted to the position of 5 mm on its upstream side of wire gauze 1, which functions to enhance the flowrate of measured fluid once by this gate nozzle 9 and moreover to flow it out of the slit 9a linearly against the nozzle inlet 3 for adjusting the flow by the wire gauze 1. The instrument error in this embodiment is shown in FIG. 5 (3), which is within +/−2%

Figure 6:
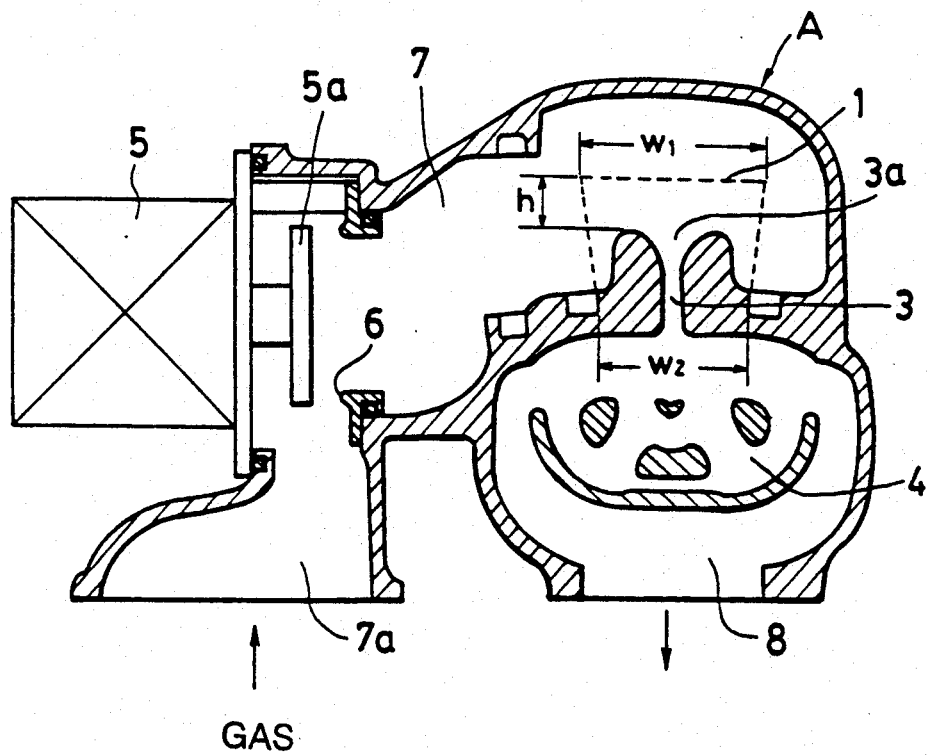
FIG. 6 is a view of the embodiment where the wire gauze has been formed to a reversed trapezoid.
Figure 8:
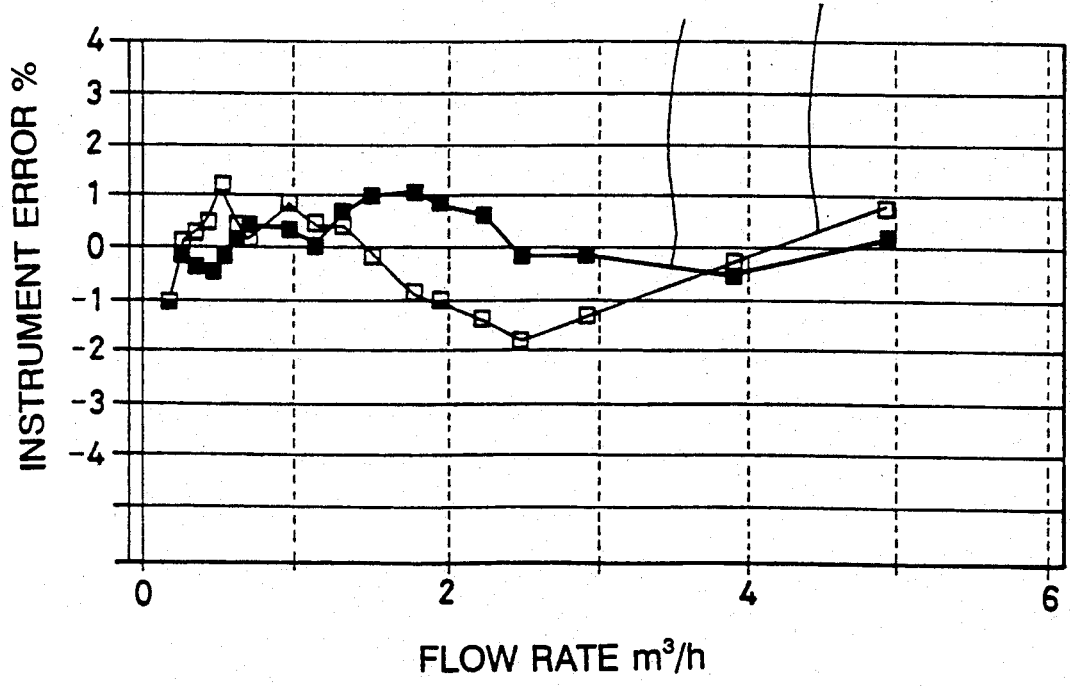
FIG. 8 is a graph comparing the performances of fluidic elements shown in the embodiments of FIG. 6 and FIG. 7.

FIG. 6 shows another embodiment of 3 m3/h type where the wire gauze 1 of reversed trapezoid measuring h=9 mm, $W_1 = 30$ mm and $W_2 = 26$ mm (30 mesh) is fitted, and the instrument error in 0.1 to 3.0 m³/h type is in the order of +/−2% as shown in FIG. 8.

Figure 7:
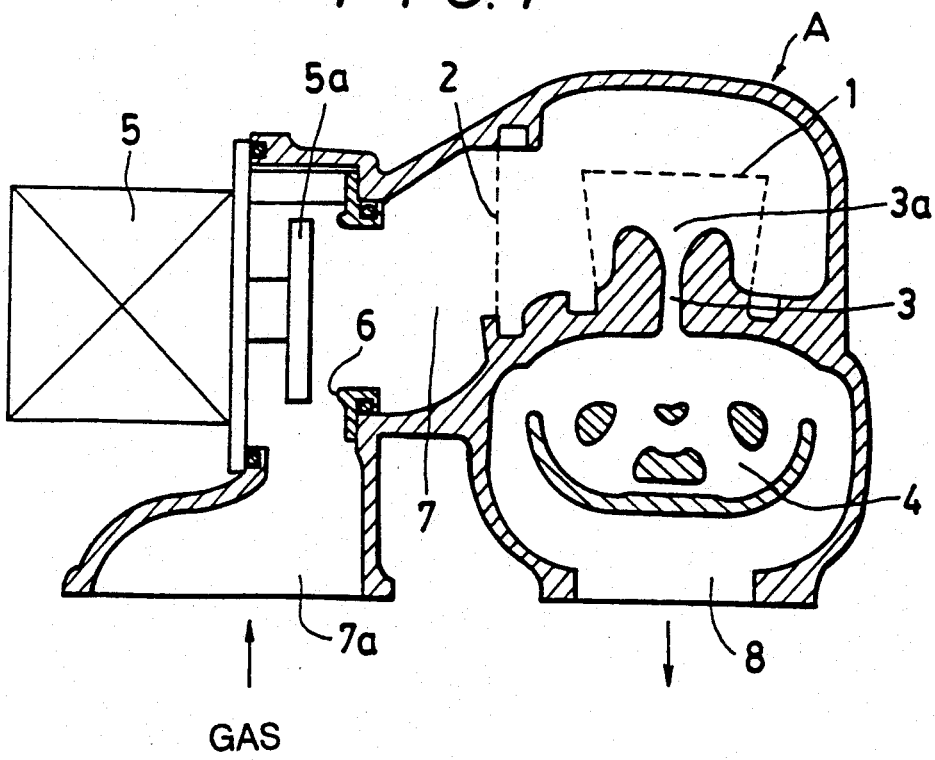
FIG. 7 is a view of the embodiment where a wire gauze of reversed trapezoid and a second wire gauze have been fitted.

FIG. 7 shows an embodiment where the second wire gauze 2 (=30 mesh) is installed to the position of 25 mm on the downstream side of valve 5a in addition to the wire gauze 1 of FIG. 6, and the instrument error in 0.1 to 3.0 m³/m type is in the order of +/−1% as shown in FIG. 8.

For reference, the said embodiments all use the wire gauge, but substances like a net braided, for example, by Nylon yarn, or the metal of honeycomb shape, a plastic panel, a punched metal and so forth can be used in place of the said wire gauze.

As described above, the present invention has tried to equalize the flowrate distribution of measured fluid entering into the nozzle by fitting the wire gauze, that serves to smooth the flow, on the upstream side of nozzle.

As a result, the flowrate distribution of the measured fluid blowing out of the nozzle can be equalized, and the measurement error and the instrument error can be lowered to less than 5% in the case of fitting one stage of wire gauze and can be lowered to less than +/−2% in the case of fitting two stages of wire gauze, and in the case of fitting the second nozzle.

According to the present invention, because the flowrate flowing into the nozzle becomes stable and, as a result, a stable fluid vibration (oscillation frequency) can be generated in all the flowrate ranges in whatever shape the flow channel should be formed on the upstream side of nozzle and wire gauze portion, there is such a effect that the flowmeter can be designed to a compact size without being governed by its installation conditions against the piping.

While specific embodiments of the invention have been shown and described in detail to illustrate the application of the principles of the invention, it will be understood that the invention may be embodied otherwise without departing from such principles.

What is claimed is:

1. A fluidic flow meter comprising:
   a fluid inlet;
   a valve means in communication with said inlet and for controlling a flow or fluid from said fluid inlet, said valve means including a valve and a valve seat, said valve means receiving fluid from said valve inlet, said valve seat being positioned in a plane substantially parallel to a direction of flow of said fluid in said fluid inlet, said valve seat defining an opening centered about a line substantially 90° to an inlet flow direction;

a fluid flow channel having a first end in communication with said valve seat and guiding said fluid away from said valve means;

a vibration generating chamber means receiving said fluid from said fluid flow channel, and generating a vibration proportional to a flow rate of said fluid, said vibration generating chamber means including a nozzle in communication with a second end of said fluid flow channel, said fluid flow channel guiding said fluid at said second end in a direction substantially perpendicular to a longitudinal axis of said nozzle, and said nozzle receiving fluid in a direction substantially perpendicular to a direction of said fluid exiting said valve seat, said direction of fluid flowing in said nozzle being substantially parallel and opposite in direction to said fluid flowing is said fluid inlet;

a fluid adjusting means placed in said fluid flow channel for smoothing said flow of fluid in said fluid flow channel and substantially removing turbulence in said fluid which is caused by said valve means, said fluid adjusting means substantially removing vortex's in said fluid flow which would adversely effect said vibration generated in said vibration generating chamber means.

2. A fluidic flowmeter in accordance with claim 1, further comprising:
sensor means generating an electrical signal proportional to said vibration generated in said vibration generating chamber means.

3. A fluidic flowmeter in accordance with claim 2, further comprising:
flowrate processor means for receiving said electrical signal and calculating amount of said fluid passed through the flowmeter.

4. A fluidic flowmeter in accordance with claim 1, further comprising:
said fluid adjusting means includes a first net of #30 mesh positioned 25 mm downstream of said valve and across said fluid flow channel and includes a second trapezoidal net of #30 mesh with a height of 9 mm, a top width of 30 mm, a bottom width of 26 mm, said second trapezoidal net surrounding said nozzle and extending into said fluid flow channel, said fluid adjusting means producing an error in measuring flowrates between 0.1 and 3 $M^3/h$ to $+/-1\%$.

5. A flow meter in accordance with claim 1, wherein:
said nozzle of said vibration generating chamber means has an end extending into said fluid flow channel; and
said fluid adjusting means is a net surrounding said end of said nozzle and extending further into said fluid flow channel than said end of said nozzle.

6. A fluidic flowmeter in accordance with claim 5, wherein:
said net is in a trapezoidal shape.

7. A fluidic flowmeter in accordance with claim 6, wherein:
said net has a height of 16 mm and a width of 20 mm on a topside and a width of 30 mm on a bottomside.

8. A fluidic flowmeter in accordance with claim 5, wherein:
said net has 20 lines per inch.

9. A flow meter in accordance with claim 6, wherein:
said trapezoid shape has a topside portion smaller than a bottom side portion.

10. A flow meter in accordance with claim 6, wherein:
said trapezoid shape has a topside portion larger than a bottom side portion.

11. A flow meter in accordance with claim 5, wherein:
said net is formed of synthetic fiber yarn.

12. A flow meter in accordance with claim 5, wherein:
said fluid adjusting means has an additional net positioned upstream of said net surrounding said end of said nozzle, and said additional net extends across said fluid flow channel.

13. A flow meter in accordance with claim 5, further comprising:
a gate nozzle surrounding said end of said nozzle and said net, said gate nozzle extending further into said fluid flow channel than said net, said gate nozzle defining a slit positioned substantially opposite said end of said nozzle, said slit guiding said flow in said fluid flow channel substantially linearly against said nozzle.

14. A flow meter in accordance with claim 1, wherein:
said vibration generating chamber means has an outlet on a same side of the flow meter has said fluid inlet; and
said outlet discharges said fluid in a direction substantially parallel and opposite said direction of fluid in said fluid inlet.

15. A flow meter in accordance with claim 1, wherein:
said fluid adjusting means also removes turbulence caused by said changes in direction of said fluid between said fluid inlet and said vibration generating chamber means.

16. A fluidic flow meter comprising:
a fluid inlet;
a valve means in communication with said inlet and for controlling a flow of fluid from said fluid inlet, said valve means including a valve and a valve seat, said valve means receiving fluid from said valve inlet, said valve seat being positioned in a plane substantially parallel to a direction of flow of said fluid in said fluid inlet;
a fluid flow channel having a first end in communication with said valve seat and guiding said fluid away from said valve means;
a vibration generating chamber means receiving said fluid from said fluid flow channel, and generating a vibration proportional to a flow rate of said fluid, said vibration generating chamber means including a nozzle in communication with a second end of said fluid flow channel, and said nozzle receiving fluid in a direction substantially perpendicular to a direction of said fluid exiting said valve seat, said direction of fluid flowing in said nozzle being substantially parallel and opposite in direction to said fluid flowing in said fluid inlet;
a fluid adjusting means placed in said fluid flow channel for smoothing said flow of fluid in said fluid flow channel and substantially removing turbulence in said fluid which is caused by said valve means, said fluid adjusting means substantially removing vortex's in said fluid flow which would adversely effect said vibration generated in said vibration generating chamber means.

* * * * *